Aug. 9, 1938.  M. J. YOUNG  2,125,976
CHILD'S VEHICLE
Filed Feb. 27, 1936

INVENTOR.
Michael Joseph Young
BY F. Lederman
ATTORNEY.

Patented Aug. 9, 1938

2,125,976

UNITED STATES PATENT OFFICE 2,125,976

CHILD'S VEHICLE

Michael Joseph Young, North Bergen, N. J.

Application February 27, 1936, Serial No. 65,971

1 Claim. (Cl. 280—1.16)

One object of this invention is the provision of a pedal operated tricycle type of child's vehicle having mounted in the front thereof a figure of an animal such as a horse having pivoted legs operatively connected with the pedals of the vehicle so that the animal simulates a walking movement while the vehicle is being propelled.

A further object of the invention is the provision of connecting links between the pedals of the vehicle and the pivoted legs of the animal figure so that the legs of the figure are caused to move in simulation of the natural walking of an animal.

A still further object of the invention is the provision of a pivoted steering wheel mounted in the body of the animal figure, which is also pivoted so that steering of the vehicle may be accomplished by drawing on either side of a pair of reins attached to the pivoted head and held in the hands of the operator.

The above and other objects will become apparent in the description below, in which characters of reference refer to like-named parts in the accompanying drawing.

Referring briefly to the drawing.

Figure 1:
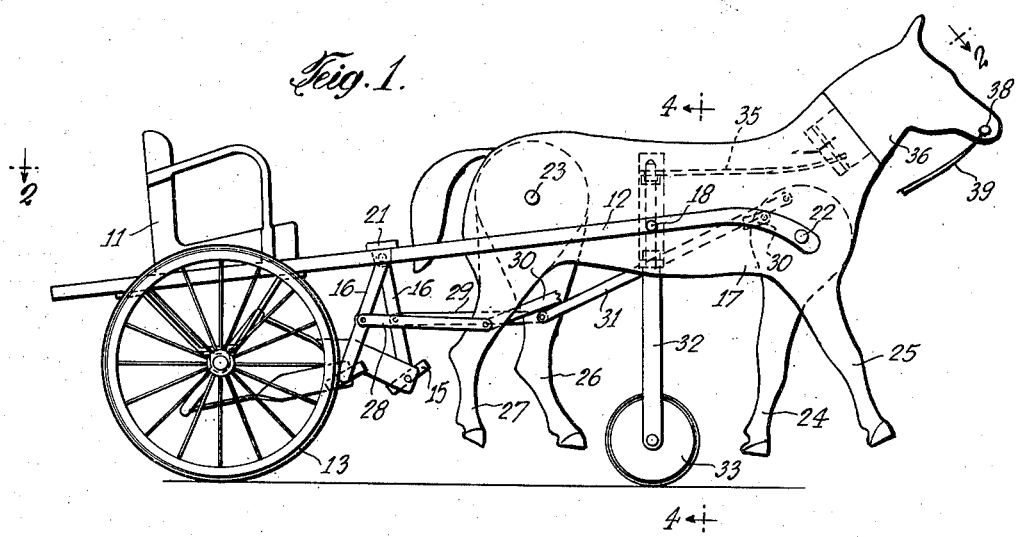
Figure 1 is a side elevational view of the device, with parts broken away for the sake of clarity.
Figure 2:
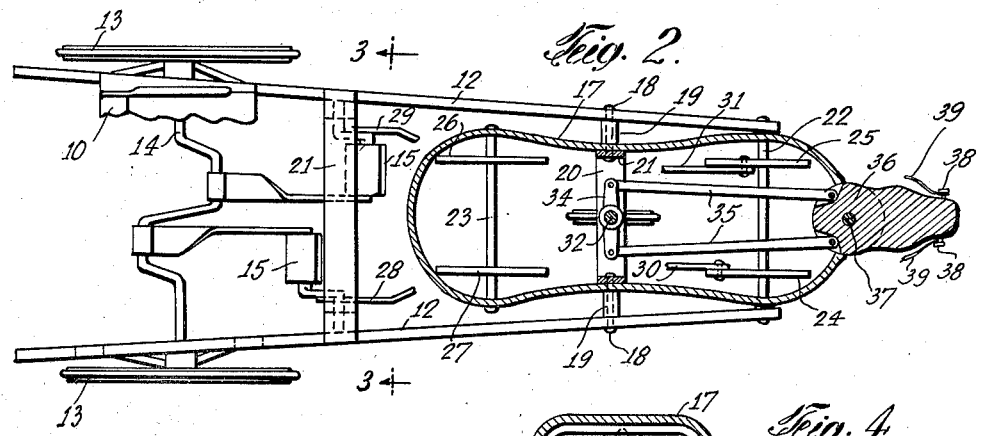
Figure 2 is a cross-sectional view taken on the line 2—2 of Figure 1.
Figure 3:
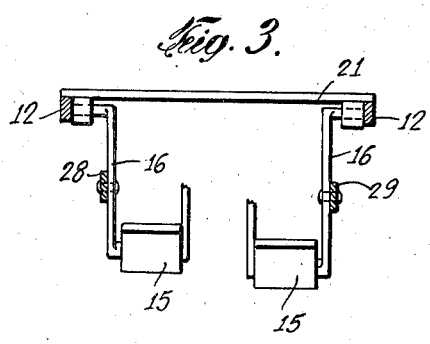
Figure 3 is a cross-sectional view taken on the line 3—3 of Figure 2.
Figure 4:
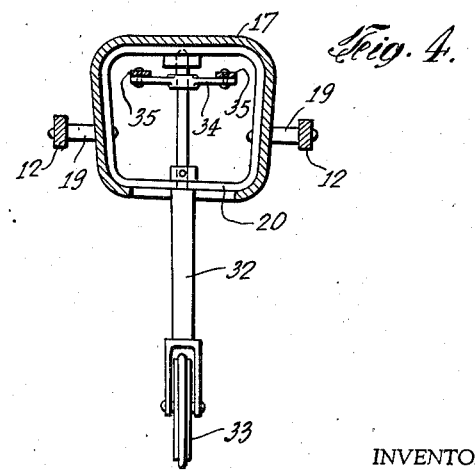
Figure 4 is a cross-sectional view taken on the line 4—4 of Figure 1.

Referring in detail to the drawing, the numeral 10 represents the frame of a cart-like vehicle having a seat 11 and provided with a pair of shaft members 12 extending forward from the frame 10. The wheels 13 are fixedly mounted on the ends of crank shaft 14 rotatably supported from the frame 10. Pedals 15 are attached to the crank shaft 14 for the purpose of rotating the latter in the usual manner. The forward ends of these pedals are pivotally suspended from links 16, one of which links is pivotally secured at either side of the shaft members 12 to a sleeve on the underside of the cross frame brace 21.

A hollow figure of a horse 17 is mounted between the forward members 12 by means of pins 18 extending through spacer sleeves 19 into the body of the figure. A vertical endless body brace 20 is mounted in the figure 17 in the sides of which the ends of the pins 18 are anchored. At the forward end of the figure 17 a rod 22, extending through the figure, is mounted between the members 12, and at the rearward end a rod 23 is mounted between the sides of the figure. The front legs 24 and 25 are pivotally suspended from the forward rod 22, and hind legs 26 and 27 are similarly suspended from the rearward rod 23.

Links 28 and 29 are pivoted at one end intermediate the length of the links 16 and at the other end intermediate the length of the hind legs 26 and 27. From the latter pivot points elongated links 30 and 31, respectively, extend angularly forward and upward and are pivotally attached to the front legs 24 and 25, respectively, at a point above the forward rod 22.

It is obvious from the above that upon operation of the pedals 15, the vehicle will be propelled, and at the same time the front right leg 25 will be moved forward while the left hind leg 26 will also move forward. Conversely, the left front leg 24 will move forward as the right hind leg moves forward. Thus the natural walk of the animal will be simulated by the figure 17.

A post 32 is rotatably mounted in the brace member 20 and is provided at its lower end with a small wheel 33 which rests upon the ground. A yoke 34 is rigidly attached to the upper end of the post 32 and from its ends links 35 extend forward and are pivoted to the head 36, the latter also being pivotally mounted on a pin 37. From either side of the tip of the head 36, bolts, hooks, or the like 38 project and serve to have reins 39 attached thereto, the other end of the reins being held in the hands of the operator, not shown.

The steering of the device is obvious. When the right hand rein is pulled, the head 36 swings to the right and at the same time rotates the post 32 and wheel 33 in the same direction and to the same degree. The converse is true when the left hand rein is pulled.

Obviously, modifications in form and structure may be made without departing from the spirit and scope of the invention.

I claim:

A vehicle comprising a frame having a crank shaft suspended therefrom and having a pair of wheels on said crank shaft, pedals connected to said crank shaft and adapted to propel the vehicle, shafts extending forward of the vehicle and having a figure of an animal mounted therebetween, a third wheel, means for rotating said third wheel to steer the vehicle, the legs of said figure being pivotally mounted thereon, means connecting said pedals with said legs for swinging the legs on one side of said figure in mutually opposite directions while said vehicle is being propelled, the head of said figure being pivotally mounted thereon, the axis of said pivotal mounting being inclined at an angle to the vertical, means for attaching reins to said head, a post extending from said third wheel and being rotatably mounted in said figure, said post having a rigid yoke at its upper end, and links connecting each end of said yoke with one side of said head.

MICHAEL JOSEPH YOUNG.